United States Patent
Oh et al.

(10) Patent No.: US 8,606,326 B2
(45) Date of Patent: Dec. 10, 2013

(54) MOBILE TERMINAL AND IMAGE DISPLAY METHOD THEREOF

(75) Inventors: Young-Suk Oh, Daegu (KR); Hye-Jin Choi, Seoul (KR); So-Young Park, Seoul (KR); Hye-Eun Shin, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 631 days.

(21) Appl. No.: 12/206,519

(22) Filed: Sep. 8, 2008

(65) Prior Publication Data

US 2009/0093275 A1    Apr. 9, 2009

(30) Foreign Application Priority Data

Oct. 4, 2007   (KR) .................. 10-2007-0100023

(51) Int. Cl.
*H04M 1/00*    (2006.01)

(52) U.S. Cl.
USPC ........... 455/566; 455/418; 715/700; 715/835; 715/713; 345/589; 345/173; 345/1.3

(58) Field of Classification Search
USPC ........ 455/566, 145, 154.2, 158.4, 158.5, 556; 345/173, 594, 619, 629, 634, 713, 589; 715/212, 217–220, 240, 243–245, 715/784–788, 790, 798–802, 864
See application file for complete search history.

(56) References Cited

U.S. PATENT DOCUMENTS

| | | | |
|---|---|---|---|
| 6,031,631 A * | 2/2000 | Tahara et al. ................. | 358/296 |
| 2002/0070982 A1 | 6/2002 | Hill et al. | |
| 2003/0030664 A1* | 2/2003 | Parry ............................ | 345/744 |
| 2006/0001650 A1* | 1/2006 | Robbins et al. ............... | 345/173 |
| 2006/0007178 A1* | 1/2006 | Davis ............................ | 345/173 |
| 2006/0064639 A1* | 3/2006 | Reid et al. .................... | 715/700 |
| 2006/0174211 A1* | 8/2006 | Hoellerer et al. ............. | 715/782 |
| 2008/0040668 A1* | 2/2008 | Ala-Rantala .................. | 715/713 |
| 2008/0122796 A1* | 5/2008 | Jobs et al. .................... | 345/173 |
| 2008/0168478 A1* | 7/2008 | Platzer et al. ................. | 719/328 |
| 2010/0118045 A1* | 5/2010 | Brown Elliott et al. ...... | 345/589 |

FOREIGN PATENT DOCUMENTS

| | | | |
|---|---|---|---|
| CN | 1829286 A | | 9/2006 |
| EP | 1 128 656 A2 | | 8/2001 |
| EP | 1128656 A2 | * | 8/2001 |

* cited by examiner

*Primary Examiner* — Mahendra Patel

(74) *Attorney, Agent, or Firm* — Birch, Stewart, Kolasch & Birch, LLP

(57) ABSTRACT

A method for displaying images in a plurality of groups so as to allow a user to simultaneously preview the images on one screen, and a mobile terminal implementing such method, the mobile terminal including: a display for displaying a plurality of image groups and images included in each image group, a user input unit for receiving a user's command input about a certain position or direction so as to move the displayed plurality of image groups or images included in a specific group, and a controller for controlling the above components so as to move the displayed image groups or the images within the specific group in a commanded certain position or direction.

6 Claims, 6 Drawing Sheets

MOBILE TERMINAL AND IMAGE DISPLAY METHOD THEREOF

CROSS REFERENCE TO RELATED APPLICATIONS

The present application is related to, and claims priority to, Korean patent application No. 10-2007-0100023, filed on Oct. 4, 2007, the entire contents of which are incorporated by reference.

BACKGROUND OF THE INVENTION

1. Field of the Invention

The present invention relates to a method for displaying images of each group of images stored by being divided into a plurality of groups in a mobile terminal so as to allow a user to easily search or select images, and to a mobile terminal implementing such method.

2. Description of the Background Art

In general, a mobile terminal is a portable device which is equipped with one or more functions among a voice/video communication function, an information input/output function, a data storage function, and the like.

As the functions thereof become diversified, the mobile terminal incorporates a variety of complicated functions, such as capturing images or video via a camera, playing music files or video files, playing games, receiving broadcasts, and the like. Also, the mobile terminal has been implemented as an integrated multimedia player Related art mobile terminals display images stored by being divided into a plurality of groups, in which if a certain group is selected, a plurality of images included in the group are displayed in an index format screen display using thumbnail images, and an original image corresponding to a thumbnail image selected on the index screen is displayed in a full screen display format.

Accordingly, if images included in a certain other group are to be displayed, a user must select the certain group from among a group list. If the certain new group is thusly selected, only thumbnail images of the images included in the group are displayed in the index screen display. That is, the images included in the group prior to the group change are not displayed in the index screen display.

SUMMARY OF THE INVENTION

Therefore, it is an object of the present invention to provide a method for simultaneously displaying images of each group so as to enable easily searching or selection of images stored by being divided into a plurality of groups, and a mobile terminal implementing the same.

The present invention is directed to provide a method for displaying a group of stored images so as to be intuitively recognizable and for easily moving to another group after selecting an image of a certain group, and to a mobile terminal implementing the method.

To achieve these and other advantages and in accordance with the purposes of the present invention, as embodied and broadly described herein, there is provided according to an embodiment a mobile terminal, including: a display for displaying a plurality of image groups and images included in each image group, a user input unit for receiving a user's command input about a certain position or direction so as to move the displayed plurality of image groups or images included in a specific group, and a controller for controlling the above components so as to move the displayed image groups or the images within the specific group to the command certain position or direction.

To achieve these and other advantages and in accordance with the purposes of the present invention, as embodied and broadly described herein, there is provided according to an embodiment an image display method for a mobile terminal, including: displaying a plurality of image groups and images included in each image group in rows or columns, and detecting a user's command input through flicking or dragging, and scrolling the displayed image groups or images included in a specific group in the commanded direction.

The present invention has an effect of enabling easily comparing images in each group by displaying the images included in all image groups on an index screen display without selecting or changing the images each stored in the plurality of groups.

The present invention also has an effect of allowing a user to simultaneously refer to images included in a plurality of groups and to easily select or move an image of a certain group to another group in an intuitive manner.

The foregoing and other objects, features, aspects and advantages of the present invention will become more apparent from the following detailed description of the present invention when taken in conjunction with the accompanying drawings.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

In the drawings.

DETAILED DESCRIPTION OF THE INVENTION

Figure 1:
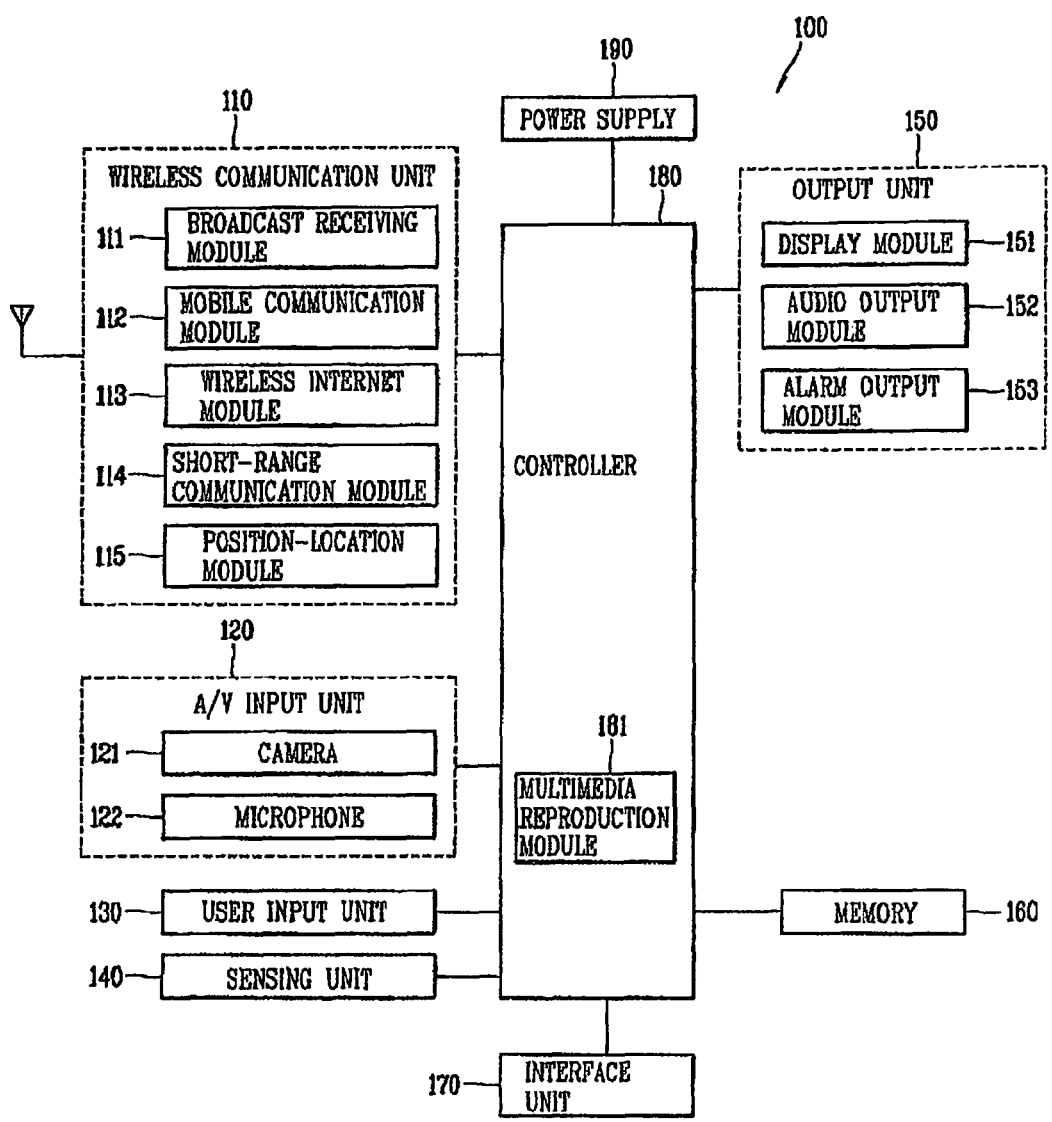
FIG. 1 is a schematic block diagram of a mobile terminal according to one embodiment of the present invention.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numerals will be used throughout the drawings to refer to the same or similar parts.

The mobile terminal may be implemented in various forms. Examples of such terminals include mobile phones, user equipment, smart phones, notebook computers, digital broadcast receiver terminals, personal digital assistants (PDA), portable multimedia players (PMP) and mobile navigation units.

FIG. 1 is a schematic block diagram of a mobile terminal according to one embodiment of the present invention.

Referring to FIG. 1, the mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, and the like. FIG. 1 shows the mobile terminal 100 having various components, but it is to be understood that implementing all of the illustrated components is not a requirement. A greater or fewer number of components may alternatively be implemented.

Hereinafter, the components of the mobile terminal will be described in more detail.

The wireless communication unit 110 typically includes one or more components allowing radio (wireless) communication between the mobile terminal 100 and a wireless communication system or a network within which the mobile terminal is located.

The wireless communication unit 110 may include a broadcast receiver module 111, a mobile communication module 112, a wireless internet module 113, a short-range communication module 114, a GPS module 115, and the like.

The broadcast receiver module 111 receives a broadcast signal and/or broadcast associated information from an external broadcast managing server via a broadcast channel. The broadcast channel may include a satellite channel and a terrestrial channel.

The broadcast managing server may refer to a server that generates and transmits a broadcast signal and/or broadcast associated information or a server that receives a previously generated broadcast signal and/or broadcast associated information and transmits the same to a terminal. Examples of the broadcast associated information may include information regarding a broadcast channel, a broadcast program, a broadcast service provider, etc. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information may be provided also via a mobile communication network and, in this case, the broadcast associated information may be received by the mobile communication module 112.

The broadcast associated information may exist in various forms. For example, it may exist in the form of an electronic program guide (EPG) of digital multimedia broadcasting (DMB), an electronic service guide (ESG) of digital video broadcast-handheld (DVB-H), and the like.

The broadcast receiver module 111 may be configured to receive broadcast signals using various types of broadcast systems. In particular, the broadcast receiver module 111 may receive a digital broadcast signal using a digital broadcast system, such as Digital Multimedia Broadcasting-Terrestrial (DMB-T), Digital Multimedia Broadcasting-Satellite (DMB-S), Digital Video Broadcast-Handheld (DVB-H), the data broadcasting system known as media forward link only (MediaFLO®), Integrated Services Digital Broadcast-Terrestrial (ISDB-T), and the like. The broadcast receiver module 111 is configured to be suitable for every broadcast system that provides a broadcast signal as well as the above-mentioned digital broadcast systems.

A broadcast signal and/or broadcast-associated information received via the broadcast receiver module 111 may be stored in the memory 160.

The mobile communication module 112 transmits/receives radio signals to/from at least one of a base station, an external terminal and a server in a mobile communication network. Such radio signals may include a voice call signal, a video call signal or various types of data according to text/multimedia message transmission/reception.

The wireless internet module 113 supports Internet access for the mobile terminal. This module 113 may be internally or externally coupled to the terminal.

The short-range communication module 114 refers to a module for supporting short range communications. Some examples of short-range communication technology include Bluetooth™, Radio Frequency IDentification (RFID), Infrared Data Association (IrDA), Ultra-WideBand (UWB), ZigBee™, and the like.

The GPS (Global Positioning System) module 115 is a module that receives location information from a plurality of artificial satellites.

The A/V input unit 120 is configured to input an audio or video signal. The AN input unit 120 may include a camera 121 and a microphone 122. The camera 121 processes image frames of still pictures or videos obtained by an image capture device in a video call mode or an image capturing mode. The processed image frames may be displayed on a display module 151 of the output unit 150.

The image frames processed by the camera 121 may be stored in the memory 160 Or transmitted via the wireless communication unit 110. Two or more cameras 121 may be provided according to the configuration of the mobile terminal.

The microphone 122 may receive an external analog audio signal (audible sound) via a microphone (or the like) in a phone call mode, a recording mode, a voice recognition mode, etc., and process it into digital data. The processed audio (voice) data may be converted for output into a format transmittable to a mobile communication base station via the mobile communication module 112 in case of the phone call mode. The microphone 122 may include various types of noise canceling (or suppression) algorithms to cancel (or suppress) noise generated in the course of receiving and transmitting audio signals.

The user input unit 130 may generate key input data inputted by a user to control various operations of the mobile terminal. The user input unit 130 may include a keypad, a dome switch, a touch pad (e.g., a touch sensitive member that detects changes in resistance, pressure, capacitance, etc.), a jog wheel, a jog switch, and the like. In particular, when a touch pad is overlaid on the display module 151 in a layered manner, it may be referred to as a touch screen.

The sensing unit 140 detects a current status (or state) of the mobile terminal 100 such as an opened/closed state of the mobile terminal 100, a location of the mobile terminal 100, a presence or absence of user contact with the mobile terminal 100, etc., and generates commands or signals for controlling the operation of the mobile terminal 100.

For example, when the mobile terminal 100 is a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 serves as an interface with at least one external device connected with the mobile terminal 100. For example, the external devices may include wired/wireless headset ports, external power charger ports, wired/wireless data ports, card sockets, e.g., memory card ports, SIM/UIM/UICC cards, audio input/output (I/O) ports, video I/O ports, earphone ports, among others. The interface unit 170 may be used to receive inputs (e.g., data, information, power, etc.) from an external device and transfer the received inputs to one or more elements within the mobile terminal 100 or may be used to transfer data from the mobile terminal to an external device.

The output unit 150 is configured to provide outputs in a visual, audible, and/or tactile manner (e.g., audio signal, video signal, alarm signal, etc.). The output unit 150 may include the display module 151, an audio output module 152, an alarm output module 153, and the like.

The display module 151 may output information processed in the mobile terminal 100. For example, when the mobile terminal 100 is in the phone call mode, the display module 151 may display a User Interface (UI) or a Graphic User Interface (GUI) associated with a call or other communication on a screen display thereof. When the mobile terminal 100 is in the video call mode or the image capturing mode, the display module 151 may display a captured and/or received image, a UI, a GUI, and the like on its screen display.

Meanwhile, when the display module 151 and the touch pad are overlaid in a layered manner to form a touch screen, the display module 151 may function as both an input device and an output device.

The display module 151 may include at least one of a Liquid Crystal Display (LCD) panel, a Thin Film Transistor-LCD (TFT-LCD) panel, an Organic Light Emitting Diode (OLED) display, a flexible display screen, a three-dimensional (3D) display screen, or the like.

The mobile terminal 100 may include two or more display modules (or other display means) 151 according to its desired implementation For example, the mobile terminal 100 may include an external display unit (not shown) and an internal display unit (not shown).

The audio output module 152 may output audio data received from the wireless communication unit 110 or stored in the memory 160 in a call signal reception mode, a call mode, a recording mode, a voice recognition mode, a broadcast reception mode, and the like.

Also, the audio output module 152 may provide audible outputs related to a particular function (e.g., a call signal reception sound, a message reception sound, etc.) performed by the mobile terminal 100. The audio output module 152 may include a speaker, a buzzer, or the like.

The alarm output module 153 may provide outputs to inform about the occurrence of an event of the mobile terminal 100. Typical events may include a call signal reception, a message reception, a key signal input, and the like. In addition to audio or video outputs, the alarm output module 153 may provide outputs in a different manner to inform about the occurrence of an event.

For example, the alarm output module 153 may provide outputs in the form of vibrations (or other tactile means). When a call signal, a message, or some other incoming communication is received, the alarm output module 153 may provide tactile outputs (i.e., vibrations) to inform the user. By providing tactile outputs, the user can recognize the occurrence of various events. Outputs informing about the occurrence of an event may be also provided via the display module 151 or the audio output module 152.

The memory 160 may store software programs or the like used for the processing and controlling performed by the controller 180, or may temporarily store inputted/outputted data (e.g., a phonebook, messages, still images, video, etc.).

The memory 160 may include at least one type of storage medium including a flash memory type, a hard disk type, a multimedia card micro type, a card-type memory (e.g., SD or XD memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM) magnetic memory, a magnetic disk an optical disk, and the like. Also, the mobile terminal 100 may cooperate with a web storage device on the internet that remotely performs the storage function of the memory 160.

The controller 180 typically controls the general operations of the mobile terminal. For example, the controller 180 performs controlling and processing associated with voice calls, data communications, video calls, and the like. In addition, the controller 180 may include a multimedia reproduction module 181 for reproducing multimedia data. The multimedia reproduction module 181 may be implemented integrally within the controller 180 or by software executed therein, or may be configured separately from the controller 180.

The power supply unit 190 receives external or internal power and supplies power required for the operations of the respective elements under the control of the controller 180.

Various functionalities described herein may be implemented in a computer-readable medium using, for example, computer software, hardware, or any combination thereof.

For a hardware implementation, the functionalities described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such functionalities may be implemented by the controller 180.

For a software implementation, the functionalities such as operation procedures or functions may be implemented together with separate software modules that allow performing of at least one function or operation. Software codes can be implemented by a software application written in any suitable programming language. The software codes may be stored in the memory 160 and executed by the controller 180.

So far, the mobile terminal has been described from the perspective of its functions. Hereinafter, external elements of the mobile terminal will be described from the perspective of their functions with reference to FIGS. 2 and 3. The mobile terminal may be implemented in a variety of different configurations. Examples of such configurations include a folder-type, a bar-type, a swing-type, a slide type and combinations thereof. For clarity, further description will primarily relate to a slide-type mobile terminal. However such teachings apply equally to other types of mobile terminals.

Figure 2:
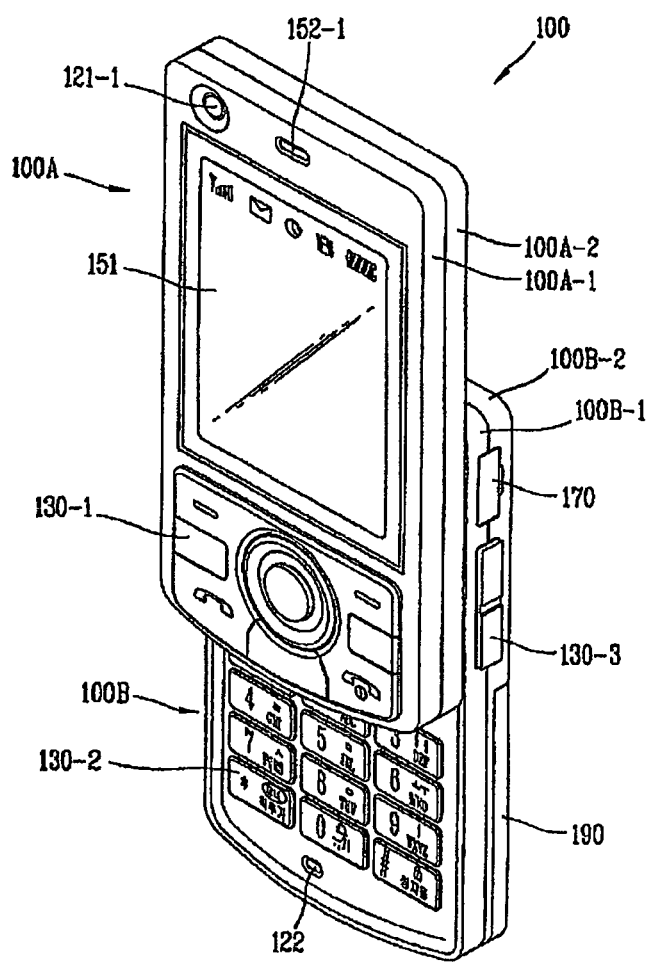
FIG. 2 is a front perspective view showing an exemplary mobile terminal according to the present invention.

FIG. 2 is a front perspective view of a slide-type mobile terminal according to the present invention. The mobile terminal of FIG. 2 can be the same as or similar to the mobile terminal of FIG. 1. The slide-type mobile terminal according to the present invention includes a first body 100A and a second body 100B disposed to be slidably movable along at least one direction relative to one another.

A state in which the first body 100A is disposed to overlap with or overlie the second body 100B may be called a "closed configuration," and as shown in the drawing, a state in which the first body 100A and second body 100B are so disposed relative one another as to expose at least a portion of the second body 100B may be called an "opened configuration." In the closed configuration, the mobile terminal mainly operates in a standby mode (idle mode), and the standby mode may be released according to a user manipulation. The mobile terminal operates mainly in the calling mode or the like in the opened configuration, and it can be changed to the standby mode with the lapse of a certain time period or a user manipulation.

The case (a casing, a housing, a cover, etc.) constituting the external appearance of the first body 100A is formed by a first front case 100A-1 and a first rear case 100A-2. Various electronic components are installed in a space between the first front case 100A-1 and the first rear case 100A-2. One or more intermediate cases may be additionally disposed between the first front case 100A-1 and the first rear case 100A-2.

The cases may be formed by injection-molding a synthetic resin or may be made of a metallic material such as stainless steel (STS) or titanium (Ti), and the like.

The display module 151, a first audio output module 152-1, a first camera module 121-1 or a first user input unit 130-1 may be located on the first body 100A, specifically, on the first front case 100A-1 of the first body 100A.

The display module 151 may include an LCD (Liquid Crystal Display), an OLED (Organic Light Emitting Diode) display, etc. that visually displays information.

A touch pad may be overlaid in a layered manner on the screen of the display module 151 to allow the display module 151 to function as a touch screen to enable the inputting of information by a user's touch.

The first audio output module 152-1 may be implemented in the form of a receiver or a speaker.

The first camera module 121-1 may be implemented to be suitable for capturing images or video with respect to the user and so on.

The first user input unit 130-1 receives an input of a command to record or capture a video call of the present invention according to a user's manipulation thereof.

Like the first body 100A, the case constituting the external appearance of the second body 100B is formed by a second front case 100B-1 and a second rear case 100B-2.

A second user input unit 130-2 may be disposed on a front face of the second body 100B, specifically, on the second front case 100B-1.

A third user input unit 130-3, the microphone 122, and the interface unit 170 may be disposed on at least one of the second front case 100B-1 and the second rear case 100B-2.

The first to third user input units 130-1, 130-2, and 130-3 may be generally referred to as the manipulation unit 130, and various techniques can be employed for implementing the manipulation unit so long as they can be operated by a user in a tactile manner. For example, the user input units 130-1, 130-2 and 130-3 can be implemented with a dome switch or touch pad that can receive user commands or information according to a user's pressing, pushing or touching, or implemented in the form of a wheel that rotates a key, a jog element, a joystick, or the like.

In terms of their functions, the first user input unit 130-1 is used for inputting commands such as start, end, scroll or the like, and the second user input unit 130-2 is used for inputting numbers, characters, symbols, or the like.

Also, the third user input unit 130-3 may operate as a hot key for activating a particular function within the mobile terminal.

The microphone 122 may be implemented in a form suitable to transduce the voice of a user, other sounds, or the like.

The interface unit 170 may be used as a link (passage or path) through which the mobile terminal can exchange data or the like with an external device. For example, the interface unit 170 may be implemented as at least one of a connection port for connecting an earphone to the mobile terminal via a wired (fixed) or wireless means, a port for short-range communications (e.g., an Infrared Data Association (IrDA) port, a Bluetooth™ port, a wireless LAN port, etc.), power supply ports for providing power to the mobile terminal, or the like. Description of the interface unit 170 has already been given, and detailed explanations therefor are omitted.

The power supply unit 190 for supplying power to the mobile terminal is located at a side portion of the second rear case 100B-2. The power supply unit 190 may be, for example, a rechargeable battery that can be detached.

Figure 3:
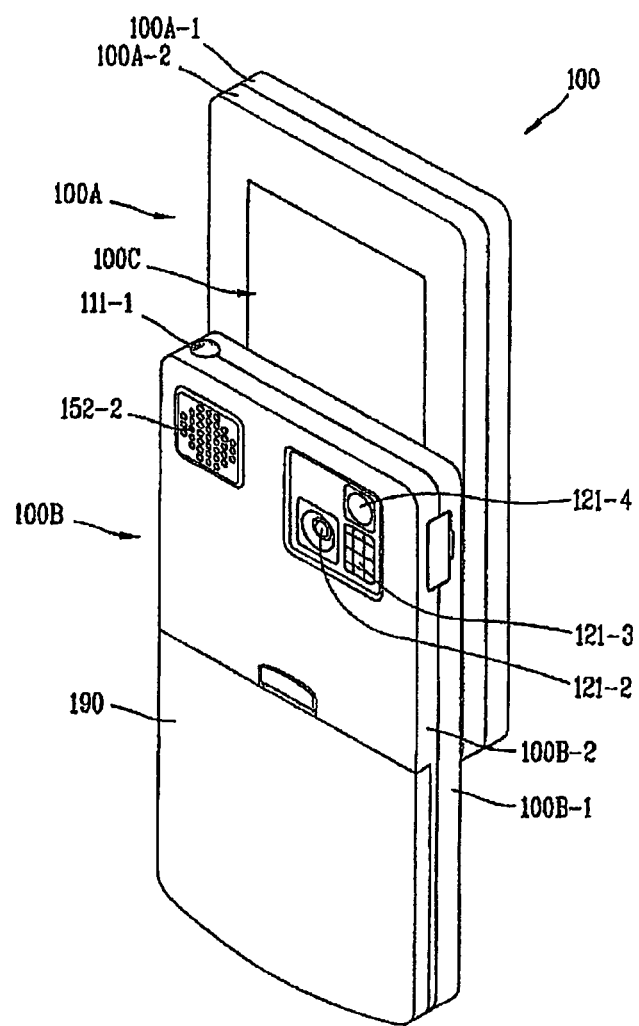
FIG. 3 is a rear view showing the mobile terminal in FIG. 2.

FIG. 3 is a rear view showing the mobile terminal in FIG. 2.

Referring to FIG. 3, a second camera module 121-2 may additionally be disposed on a rear surface of the second rear case 100B-2 of the second body 100B. The second camera module 121-2 may have an image capture direction which is substantially the opposite to that of the first camera module 121-1 (refer to FIG. 1), and may support a different resolution, image size, or number of pixels as compared to the first camera module.

For instance, the first camera module 121-1 may operate with a relatively lower resolution to capture images of a user's face and transmit the same to the other party during video call communication or the like, while the second camera module 121-2 may operate with a relatively higher resolution to capture images of general subjects with high picture quality not for immediately being transmitted but for later use or for communicating to others.

A flash lamp 121-3 and a mirror 1214 may be additionally disposed adjacent to the second camera module 121-2. When an image of a subject is to be captured with the second camera module 121-2, the flash lamp 121-3 illuminates the subject. The mirror 121-4 allows a user to see themselves when they wants to capture their own image (self-image capturing) by using the second camera module 121-2.

The second rear case 100B-2 may further include a second audio output module 152-2.

The second audio output module 152-2 may implement a stereophonic sound function in conjunction with the first audio output module 152-1 (refer to FIG. 2) and may be also used for sending and receiving audio calls in a speaker phone mode.

A broadcast signal receiving antenna 111-1 may be disposed at one side or region of the second rear case 100B-2, in addition to an antenna that supports mobile communications. The antenna 111-1 can be configured to be retractable from the second body 100B.

One part of a slide module 100C that slidably combines the first body 100A and the second body 100B may be disposed on the first rear case 100A-2 of the first body 100A.

The other part of the slide module 100C may be disposed on the second front case 100B-1 of the second body 100B, which may not be exposed as shown in the drawing.

In the above description, the second camera module 121-2 and so on is disposed on the second body 100B, but such a described configuration is not meant to be limiting.

For instance, one or more of the elements (e.g., 111-1, 121-2 and 121-3 and 152-2), which are disposed on the second rear case 100B-2 in the above description, may be mounted on the first body 100A, mainly, on the first rear case 100A-2. In this case, those elements disposed on the first rear case 100A-2 can be protected (or covered) by the second body 100B in the closed configuration. In addition, even if the second camera module 121-2 is not provided, the first camera module 121-1 may be configured to rotate (or otherwise be moved) to thus allow image capturing in various directions.

Figure 4:
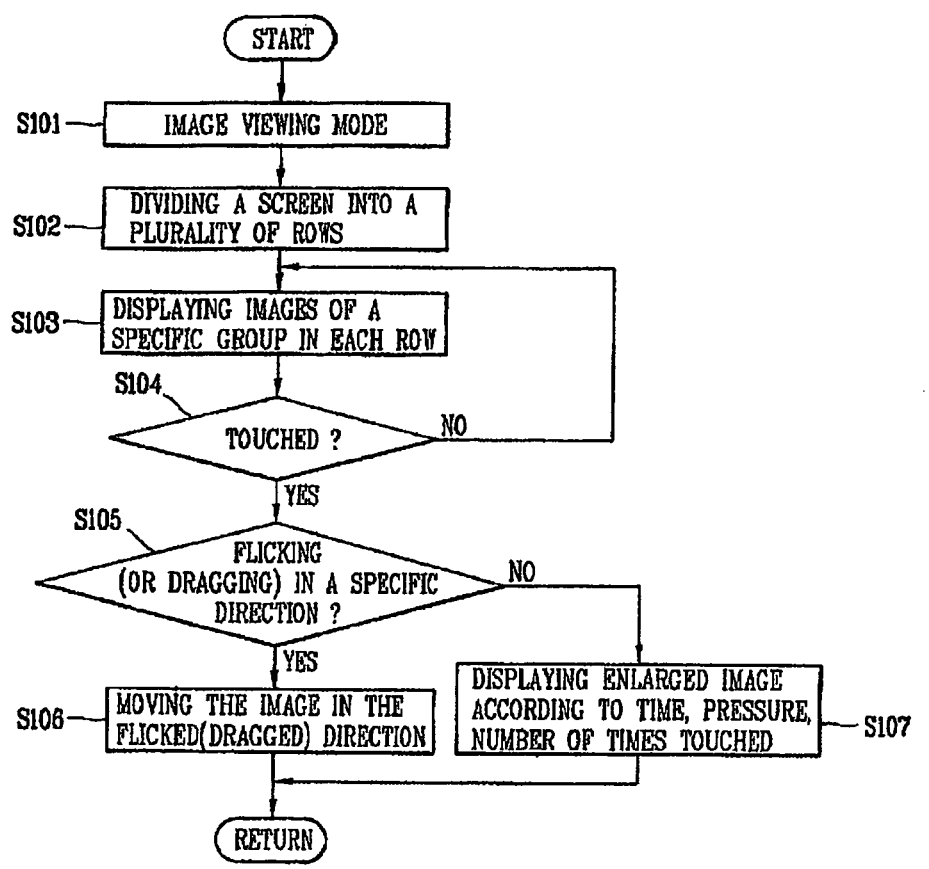
FIG. 4 is a flowchart showing an image display method for a mobile terminal according to an embodiment of the present invention.
Figure 5:
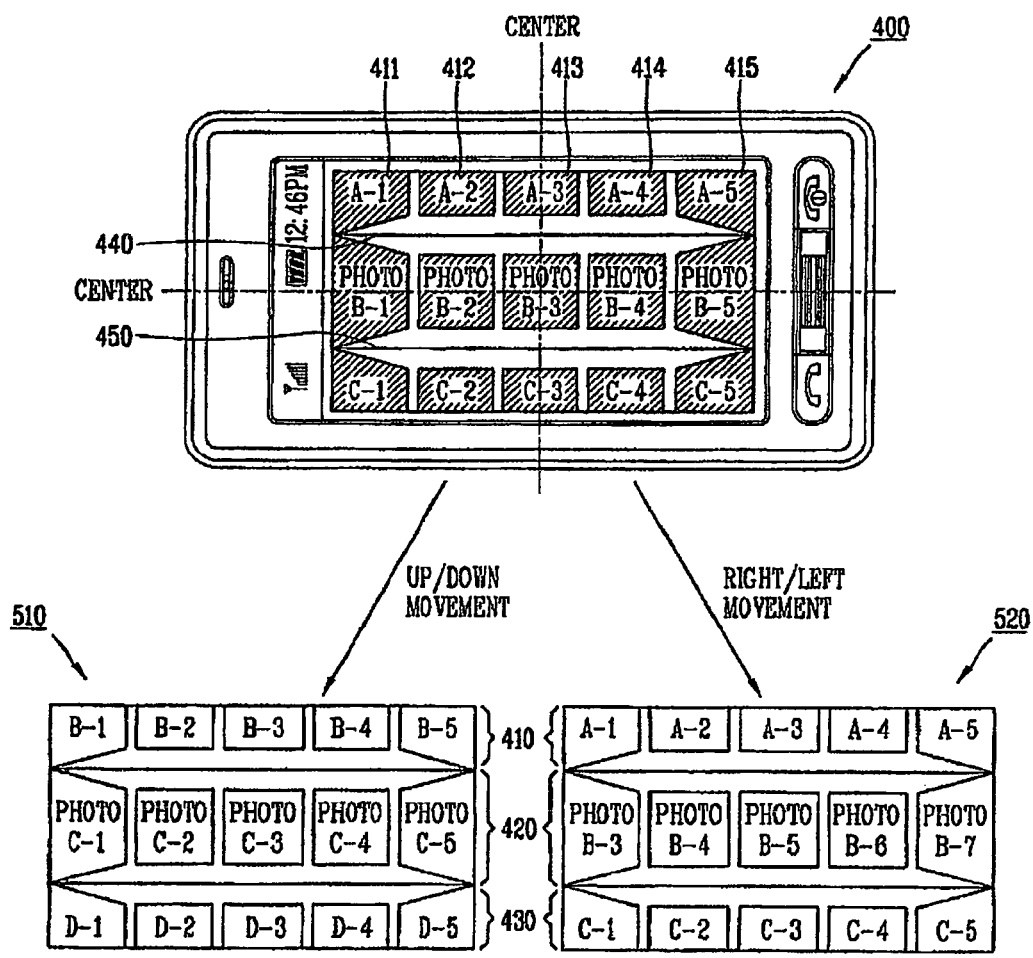
FIG. 5 is an exemplary view showing an image screen display of the mobile terminal according to an embodiment of the present invention.
Figure 6:
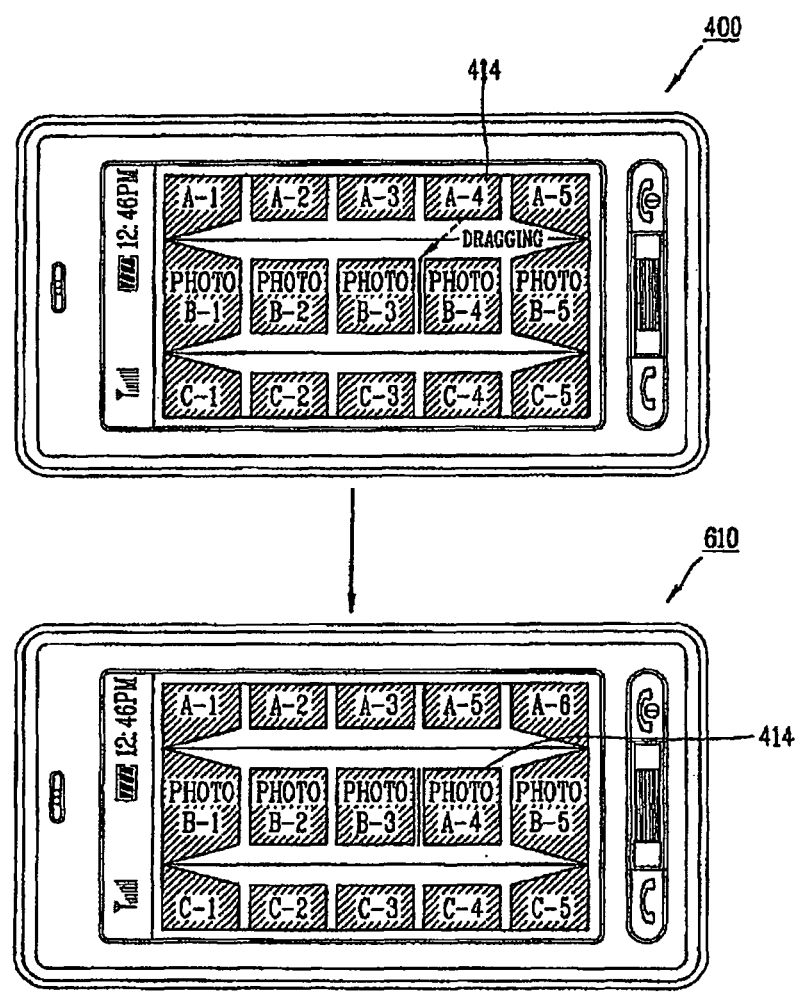
FIG. 6 is an exemplary view showing a method for moving an image in the mobile terminal according to an embodiment of the present invention.

FIG. 4 is a flowchart showing steps of an image display method for a mobile terminal according to the present invention, and FIG. 5 is an exemplary view showing an image display screen in the mobile terminal according to the present invention. The operation/methods of FIGS. 4 & 5 (and FIG. 6) as discussed below are preferably implemented by the mobile terminal of FIG. 1 or 2, but can be implanted by other suitable terminals.

Referring to FIG. 4, when the mobile terminal according to the present invention is put into an image viewing mode (S101), the controller 180, as shown in FIG. 5, is configured to divide the screen display area of the output unit 150 into a plurality of rows 410, 420, 430 (S102), and display images included in specific image groups (group A, group B and group C) in each respective row (S103).

The display images may be thumbnails that represent pictures stored in an internal memory of the mobile device and taken from an embedded camera of the mobile device, or transferred via a wired or wireless connection to another device. The thumbnails may also represent movie clips, audio clips, text files or text folders.

The rows shown on the display screen may be automatically created based on metadata associated with the corresponding files. For example, a first row may contain all stored images having a common date (or common month, or common year) of creation or of storing. Alternatively, the rows may contain all stored images having an image title with a common first letter, or a common source, or another item of common metadata. Alternatively, the rows may correspond to a user's organization of images/files. For example, a first row may correspond to a first user-created photo-album, while a second row may correspond to a second user-created photo-album. File types of rows may be the same or may be different. That is, one row may include thumbnails of photographs, while a second row may include thumbnails of moving picture files. Rows may also contain thumbnails representing a mixture of file types. Also, the thumbnails may be static or may be animated (e.g., contain a first few seconds of a corresponding movie file.)

The image viewing mode is a mode which allows a user to view a variety of multimedia files including a picture, an image, a moving picture, and the like. However, it is assumed that, for the convenience of explanation, the multimedia files in this example are picture image files.

Referring to FIG. 5, the controller 180 is configured to divide the display area on the display screen into a plurality of rows 410, 420, 430, and display images included in specific groups (or folders) in each row. Here, the width of each row may be set to be the same or different.

Such divided rows may be configured such that the row 420 relatively close to the center of the display area can be set to have the largest width, and the other two rows 410, 430 can be set to have a relatively smaller width. That is, an image displayed in a certain row may be set to display in a relatively larger size than that displayed in other rows. More specifically, the image can be shown in its original (normal) size, without being cut (i.e., cropped or cutoff) or blocked (i.e., obscured, obstructed or overlain). The images (photo B-1~photo B-5) displayed in the specific row 420 are displayed in their normal sizes without being cut or blocked, while the images displayed in the two rows 410, 430 may be displayed having portions thereof cutoff or blocked.

In order to adjust the width of each row, the user may touch upon dividers 440, 450 dividing between each row, and then drag the dividers in up/down directions. The dividers 440, 450 may not be displayed, and although the dividers are not shown, the width of each row can be adjusted by touching and dragging a space between each row.

Dragging or flicking or like touch gestures may enable the user to move or change the position of the image groups displayed in each row. Further, the user may move or change the position of the images displayed in a certain row within that certain Tow. Each of the image groups may be divided into a row or a column.

Hereinafter, description of the method for changing or moving the position of the images will be given in detail.

First, description of a method for changing the position of each image group divided into rows will be given.

After the user touches upon a certain image displayed as being divided by the dividers 440, 450 or by each row, and then drags or pushes up or pulls down in the up/down directions, the positions of the entire image groups displayed in each row can be moved or changed. Each of the image groups divided into rows in the above example may also be displayed as being divided into columns. Here, the position of the entire image groups displayed in each column can be changed by dragging or pushing or pulling in right/left directions.

For instance, if an image is touched upon and flicked up, the positions of the image groups displayed in each row are respectively scrolled up, as shown in the screen display '510' in FIG. 5. That is, the images of 'group B' displayed as the center row 420 on the display screen 400 are moved to the upper row 410 for display, and sequentially, the images of 'group C' displayed in the lower row 430 are moved to the center row 420 for display. On the contrary, when the image is flicked down, the image groups displayed in each row are displayed by sequentially being scrolled down. If each image group is displayed as being divided into columns, each of the image groups may sequentially be scrolled in the right/left directions.

Next, description of a method for moving or changing the position of the images within the image group displayed in a certain row will be given.

If the user selects an image belonging to a certain image group among the image groups divided into a plurality of rows, and then drags or pushes or pulls the selected image in the right/left directions, the controller 180 may change the position of all the images belonging to the certain image group in a rightward or leftward direction.

For instance, if the certain image within the image group displayed in the center row 420 among the plurality of rows is touched upon and flicked in a leftward direction or if an empty space between each image is touched upon and flicked, the images within the group displayed in the center row 420 are scrolled in the leftward direction, as shown in the screen display '520' in FIG. 5. As the images are scrolled, among the images belonging to 'Group B' displayed in the center row 420, images (photos B-6, B-7) that were not previously shown are newly displayed (e.g., scrolled onscreen), and some images (photos B-1, B-2) that were previously shown are no longer displayed (e.g., scrolled offscreen).

On the contrary, if a certain image is flicked in a rightward direction, the images displayed in each row are scrolled in the rightward direction for display. If each image group is divided in a column direction, images belonging to each group may be scrolled by flicking up/down.

Meanwhile, images belonging to the groups located on both sides of the dividers may be simultaneously scrolled in the right/left directions by flicking the spaces between each row or the dividers displayed between each row. To be certain, if each image group is displayed as being divided into a row direction, images belonging to a plurality of groups may be simultaneously scrolled in the up/down directions by flicking the empty spaces between each row or the dividers displayed between each row.

Flicking or dragging may be used to scroll the image groups displayed in rows/columns or the images included in each image group in a certain direction.

Here, the number of images or groups to be scrolled may be controlled by the intensity of the flicking or dragging (e.g., a touch pressure, a speed to release the touch, a dragging speed, etc.). In addition, the rate at which the groups or images are scrolled may be controlled according to the intensity of flicking or dragging. That is, the greater the intensity of flicking (dragging), the faster it is scrolled as well as the more the number of images or groups scrolled.

Meanwhile, scrolling of the images belonging to a certain group displayed in a certain row is performed separately from those belonging to another certain group displayed in another row. As shown in the screen display '520' in FIG. 5, even though the images of the image group displayed in the center row 420 are scrolled in a certain direction, the images in the image groups displayed in another rows 410, 430 are not scrolled.

However, if the dividers 440, 450 disposed between the groups so as to divide each row or the empty spaces between each row are touched upon and then dragged (or flicked) in a leftward or rightward direction, the images of the groups displayed in the rows (410 and 420, 420 and 430) on both sides of the dividers 440, 450 may simultaneously be scrolled in a certain direction. Similarly, if the image groups are displayed as being divided in a column direction, the images of the image groups displayed on both sides of empty spaces may simultaneously be scrolled in an up or down direction by touching upon the empty spaces between the image groups divided in each column and then dragging (flicking) in an up or down direction.

Regarding the images of each group divided into the plurality of rows or columns, the controller 180 may display a specific image selected through a touch or a button input on the full screen. Here, the image which can be selected to be displayed in the full screen may be limited to among the image group displayed in the center row or to the group divided into a specific row or column.

For instance, the images of the group displayed in the center row 420 may be enlarged to be displayed in the full screen according to the number of times being touched by the user, and the time and pressure of touch by the user. The number of times being touched indicates being touched two or more times in a consecutive manner. The touch time indicates the time until the touch is released. The touch pressure indicates a pressure in case a pressure when being touched is greater than a reference pressure. Moreover, when the images of the groups displayed in other designated rows 410, 430 are touched upon, they may also be enlarged to be displayed in the full screen.

Even when the specific image is displayed in the full screen, if the image is touched upon and dragged (or flicked) in a certain direction (left or right), the controller 180 according to the present invention may scroll another image within the same group and display it on the full screen. Similarly, if the image is dragged or flicked in another certain direction (up or down), the controller 180 may display a certain image belonging to another group on the full screen.

In addition, according to the present invention, an image among the images of each group divided in different rows may be dragged and moved into the image group belonging to another row. For instance, referring to the screen display 400 in FIG. 6, if an image 414 displayed in the row 410 is dragged between specific images (photos B-3, B-4) of the image group displayed in the row 420, the image 414 may be moved between the specific images (photos B-3, B-4) of the image group displayed in the row 420, as shown in the screen display 610 in FIG. 6. That is, changing of the image group as well as specifying the order of images within the changed group may be simultaneously possible.

As described above, an image in a certain group (e.g., group A) divided into a row or a column can be moved into another certain group (e.g., group B). That is, the present invention provides an effect of allowing the user to simultaneously view and refer to images of a plurality of groups and to easily move an image of a certain group into a certain position in another group in an intuitive manner.

The above example described the method for moving each image group or images within the group in a certain direction (or to a location) by dragging or flicking. A state that the image group or image is moved is consecutively shown on the display module 151, thereby allowing the user to easily recognize the direction in which an image group or image is moved or its moving speed.

Further, the present invention may restrict the moving direction of each of the image groups or images. For instance, if it is assumed that the image groups are displayed in rows, the image groups are moved only when they are flicked up. If they are flicked down, it may be recognized as a mis-operation. Likewise, when the images included in a specific image group are moved, their moving direction may be restricted. If the image group or images are to be moved in the restricted direction, it may be recognized as a mis-operation.

Having recognized such mis-operation, the controller 180 may or may not output an alarm. The alarm may be a visual display, an audible signal or a vibration.

Additional features may also be included. For example, in one embodiment, a user may be able to scroll a first row in a first direction and to simultaneously scroll a second row in an opposite direction. It is also possible to rearrange rows or columns. For example, a user may delete a displayed second row, so that the rows below shift up (e.g., the displays shifts from showing rows ABC to showing rows ACD.)

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A mobile terminal, comprising:
    a wireless communication unit configured to wirelessly communicate with at least one other terminal;
    a memory;
    a touch screen display configured to display information; and
    a controller configured to:
    display a plurality of rows of thumbnail images, wherein each row in the plurality of rows comprises a plurality of thumbnail images representing a plurality of images organized as a unique image folder so that respective images included in a first row in the plurality of rows belongs to a first image folder different from a second image folder comprising respective images included in a second row in the plurality of rows, and wherein the first folder and the second folder are stored in the memory,
    move individual thumbnail images within a respective row horizontally in response to a touch and drag action in a horizontal direction performed on the respective row and not to move individual thumbnail images in other rows, simultaneously move the plurality of rows of thumbnail images vertically in response to a touch and drag action in a vertical direction performed on the touch screen, wherein an image from the first image folder is instantly moved to the second image folder when a thumbnail image representing the image in the first row is touched and dragged to the second row, stop the movement of the individual thumbnail images within the respective row in response to another touch event after the horizontal touch and drag action, and stop the movement of the plurality of rows of thumbnail images in response to another touch event after the vertical touch and drag action.

2. The mobile terminal of claim 1, wherein a last previewed image is displayed at a center in the respective row.

3. The mobile terminal of claim 1, wherein the horizontal direction is a row direction and the vertical direction is a column direction.

4. A method of controlling a mobile terminal, the method comprising:

displaying, on a touch screen display of the mobile terminal, a plurality of rows of thumbnail images, wherein each row in the plurality of rows comprises a plurality of thumbnail images representing a plurality of images organized as a unique image folder so that respective images included in a first row in the plurality of rows belongs to a first image folder different from a second image folder comprising respective images included in a second row in the plurality of rows, and wherein the first folder and the second folder are stored in a memory;

moving individual thumbnail images within a respective row horizontally in response to a touch and drag action in a horizontal direction performed on the respective row and not to move individual thumbnail images in other rows;

simultaneously moving the plurality of rows of thumbnail images vertically in response to a touch and drag action in a vertical direction performed on the touch screen, wherein an image from the first image folder is instantly moved to the second image folder when a thumbnail image representing the image in the first row is touched and dragged to the second row;

stopping, via the controller, the movement of the individual thumbnail images within the respective row in response to another touch event after the horizontal touch and drag action; and stopping, via the controller, the movement of the plurality of rows of thumbnail images in response to another touch event after the vertical touch and drag action.

5. The method of claim 4, wherein a last previewed image is displayed at a center in the respective row.

6. The method of claim 4, wherein the horizontal direction is a row direction and the vertical direction is a column direction.

* * * * *